(12) United States Patent
Zhou et al.

(10) Patent No.: US 9,447,320 B2
(45) Date of Patent: Sep. 20, 2016

(54) TITANATE LUMINESCENT MATERIAL AND PREPARATION METHOD THEREFOR

(75) Inventors: Mingjie Zhou, Shenzhen (CN); Rong Wang, Guangdong (CN); Guitang Chen, Guangdong (CN)

(73) Assignees: OCEAN'S KING LIGHTING SCIENCE & TECHNOLOGY CO., LTD., Shenzhen (CN); SHENZHEN OCEAN'S KING LIGHTING ENGINEERING CO., LTD., Shenzhen (CN)

( * ) Notice: Subject to any disclaimer, the term of this patent is extended or adjusted under 35 U.S.C. 154(b) by 114 days.

(21) Appl. No.: 14/398,765

(22) PCT Filed: May 8, 2012

(86) PCT No.: PCT/CN2012/075197
§ 371 (c)(1),
(2), (4) Date: Nov. 4, 2014

(87) PCT Pub. No.: WO2013/166659
PCT Pub. Date: Nov. 14, 2013

(65) Prior Publication Data
US 2015/0102260 A1    Apr. 16, 2015

(51) Int. Cl.
C09K 11/87 (2006.01)
C09K 11/58 (2006.01)
C09K 11/02 (2006.01)
C09K 11/77 (2006.01)

(52) U.S. Cl.
CPC ............... *C09K 11/87* (2013.01); *C09K 11/02* (2013.01); *C09K 11/58* (2013.01); *C09K 11/7703* (2013.01)

(58) Field of Classification Search
CPC ............................... C09K 11/87; C09K 11/58
See application file for complete search history.

(56) References Cited

FOREIGN PATENT DOCUMENTS

| CN | 101775279 A | 7/2010 |
|----|-------------|--------|
| CN | 102408892   * | 4/2012 |
| CN | 102408892 A | 4/2012 |
| JP | 2005008674 A | 1/2005 |
| WO | WO-2011156955 A1 | 12/2011 |

OTHER PUBLICATIONS

International Search Report dated Jan. 24, 2013.

* cited by examiner

*Primary Examiner* — Carol M Koslow
(74) *Attorney, Agent, or Firm* — Polsinelli PC

(57) ABSTRACT

A titanate luminescent material has a formula of $A_{1-x}TiO_3$:$Pr_x$@$TiO_2$@$M_y$; wherein A is at least one selected from the group consisting of Ca, Sr, and Ba; M is at least one nanoparticles selected from the group consisting of Ag, Au, Pt, Pd, and Cu; $0<x\leq 0.01$; y is the molar ratio between M and Ti in $A_{1-x}TiO_3$:$Pr_x$@$TiO_2$, and $0<y\leq 1\times 10^{-2}$; @ represents coating; M is a core, $TiO_2$ is an intermediate layer shell, and $A_{1-x}TiO_3$:$Pr_x$ is an outer layer shell. The titanate luminescent material has a high stability and a better luminescent performance. A preparation method of the titanate luminescent material is also provided.

10 Claims, 2 Drawing Sheets

--- mixing a metal salt solution and triethanolamine titanium isopropoxide, adding a reducing agent, heating at a temperature of 120°C to 160°C with stirring, and obtaining $TiO_2$@$M_y$ colloid, rinsing and drying the colloid to prepare $TiO_2$@$M_y$ solid having a core-shell structure, wherein M is at least one nanoparticles selected from the group consisting of Ag, Au, Pt, Pd, and Cu; y is the molar ratio between M and Ti, and $0<y\leq 1\times 10^{-2}$ — S1 mixing a source compound of A, a source compound of Pr, and the $TiO_2$@$M_y$ solid to form a mixture, calcining the mixture at temperature of 800°C to 1200°C and for 2 hours to 12 hours, and then heating the mixture at temperature of 1000°C to 1400°C for 0.5 hours to 6 hours in a reducing atmosphere, cooling and grinding the mixture to prepare $A_{1-x}TiO_3$:$Pr_x$@$TiO_2$@$M_y$ powder, wherein A is at least one selected from the group consisting of Ca, Sr, and Ba; $0<x\leq 0.01$; @ represents coating; M is a core, $TiO_2$ is an intermediate layer shell, and $A_{1-x}TiO_3$:$Pr_x$ is an outer layer shell — S2

TITANATE LUMINESCENT MATERIAL AND PREPARATION METHOD THEREFOR

CROSS-REFERENCE TO RELATED APPLICATIONS

This application is a National Phase filing under 35 U.S.C. §371 of PCT/CN2012/075197 filed on May 8, 2012, the entire contents of which is hereby incorporated by reference.

FIELD OF THE INVENTION

The present disclosure relates to the field of luminescent materials, and more particularly relates to a titanate luminescent material and a preparation method thereof.

BACKGROUND OF THE INVENTION

As compared with red sulfide low voltage electroluminescent phosphor $Zn_{1-x}Cd_xS$ (x=0~1.0), titanate substrate has a good chemical stability, and the phosphor obtained by doping rare earth luminescent center ions, such as $CaTiO_3$, has a better color purity. The coordinates of red color of $Pr^{3+}$ excited by photoluminescence and cathode ray are: x=0.680, y=0.311, which are very close to that of the ideal red according to NTSC color gamut. Considering the material stability and luminous colors, the titanate substrate phosphor activated by rare earth ion is expected to replace red sulfide phosphor $Zn_{1-x}Cd_xS$ and become a new generation of non-toxic, highly stable red FED phosphor material. Accordingly, it is the goal of researchers for further improving the luminescent properties of this material.

SUMMARY OF THE INVENTION

Accordingly, it is necessary to provide a titanate luminescent material with high stability and excellent luminescent properties and a preparation method thereof.

A titanate luminescent material has a formula of $A_{1-x}TiO_3:Pr_x@TiO_2M_y$;

wherein A is at least one selected from the group consisting of Ca, Sr, and Ba;

M is at least one nanoparticles selected from the group consisting of Ag, Au, Pt, Pd, and Cu;

$0<x\leq 0.01$;

y is the molar ratio between M and Ti in $TiO_2@M_y$, and $0<y\leq 1\times 10^{-2}$;

@ represents coating; M is a core, $TiO_2$ is an intermediate layer shell, and $A_{1-x}TiO_3:Pr_x$ is an outer layer shell.

In one embodiment, $0.001 \leq x \leq 0.005$.

In one embodiment, $1\times 10^{-5} \leq y \leq 5\times 10^{-3}$.

A method of preparing a titanate luminescent material includes the following steps:

step one, mixing a metal salt solution and triethanolamine titanium isopropoxide, adding a reducing agent, heating at a temperature of 120° C. to 160° C. with stirring, and obtaining $TiO_2@M_y$ colloid, rinsing and drying the colloid to prepare $TiO_2@M_y$ solid having a core-shell structure, wherein M is at least one nanoparticles selected from the group consisting of Ag, Au, Pt, Pd, and Cu; y is the molar ratio between M and Ti, and $0<y\leq 1\times 10^{-2}$;

step two, mixing a source compound of A, a source compound of Pr, and the $TiO_2@M_y$ solid to form a mixture, calcining the mixture at temperature of 800° C. to 1200° C. and for 2 hours to 12 hours, and then heating the mixture at temperature of 1000° C. to 1400° C. for 0.5 hours to 6 hours in a reducing atmosphere, cooling and grinding the mixture to prepare $A_{1-x}TiO_3:Pr_x@TiO_2@M_y$ powder, wherein A is at least one selected from the group consisting of Ca, Sr, and Ba; $0<x\leq 0.01$; @, represents coating; M is a core, $TiO_2$ is an intermediate layer shell, and $A_{1-x}TiO_3:Pr_x$ is an outer layer shell.

In one embodiment, the source compound of A in step two is at least one selected from the group consisting of oxide, carbonate, nitrate, and hydroxide of A.

In one embodiment, the source compound of Pr in step two is at least one selected from the group consisting of oxide, carbonate, nitrate, and hydroxide of Pr.

In one embodiment, in step one, the reducing agent is dimethyl formamide; and a volume of the reducing agent is 20% to 80% of the sum volume of metal salt solution, triethanolamine titanium isopropoxide, and the reducing agent.

In one embodiment, the volume of the reducing agent is 25% to 50% of the sum volume of metal salt solution, triethanolamine titanium isopropoxide, and the reducing agent.

In one embodiment, in step one, the $TiO_2@M_y$ colloid is centrifugally precipitated and then rinsed with ethanol.

In one embodiment, the reducing atmosphere in step two comprises at least one reducing gas selected from the group consisting of mixed atmosphere of nitrogen and hydrogen, carbon, carbon monoxide, and pure hydrogen.

In the forgoing titanate luminescent material $A_{1-x}TiO_3:Pr_x@TiO_2@M_y$, the metal nanoparticles are coated by $TiO_2$, and $TiO_2$ is coated by $A_{1-x}TiO_3:Pr_x$, in other words, metal nanoparticles as a core, $TiO_2$ as an intermediate layer shell, and $A_{1-x}TiO_3:Pr_x$ as an outer layer shell, such that a titanate luminescent material with a core-shell structure is provided, thus increasing an internal quantum efficiency thereof. Additionally, since metal nanoparticles are added into the titanate luminescent material, the luminous intensity is thus increased, so that the titanate luminescent material has a high stability and a better luminescent performance. The described titanate luminescent materials can be widely applied to lighting, display and the like areas. The preparation method has many advantages, such as simple procedure, tow the equipment requirement, low cost, no pollution, and easy control of the reaction, such that it is suitable for industrial production.

DETAILED DESCRIPTION OF THE EMBODIMENTS

Reference will now be made to the drawings to describe, in detail, embodiments of the present titanate luminescent material and preparation method thereof.

An embodiment of a titanate luminescent material has a formula of $A_{1-x}TiO_3:Pr_x@TiO_2@M_y$.

wherein A is at least one selected from the group consisting of Ca, Sr, and Ba.

M is at least one nanoparticles selected from the group consisting of Ag, Au, Pt, Pd, and Cu.

$0 < x \leq 0.01$; preferably $0.001 \leq x \leq 0.005$.

y is the molar ratio between M and Ti in $TiO_2@M_y$, and $0 < y \leq 1 \times 10^{-2}$; preferably $1 \times 10^{-5} \leq y \leq 5 \times 10^{-3}$.

@ represents coating; M is a core, $TiO_2$ is an intermediate layer shell, and $A_{1-x}TiO_3:Pr_x$ is an outer layer shell. In the present embodiment, the $TiO_2$ has a spherical shape.

In the forgoing titanate luminescent material, the metal nanoparticles are coated by $TiO_2$, and $TiO_2$ is coated by $A_{1-x}TiO_3:Pr_x$, in other words, the titanate luminescent material uses M as a core, $TiO_2$ as an intermediate layer shell, and $A_{1-x}TiO_3:Pr_x$ as an outer layer shell, such that a titanate luminescent material with a core-shell structure is provided, thus increasing an internal quantum efficiency thereof. Additionally, since metal nanoparticles are added into the titanate luminescent material, the luminous intensity is thus increased, so that the titanate luminescent material has a high stability and a better luminescent performance. The described titanate luminescent materials can be widely applied to lighting, display and the like areas.

Figure 1:
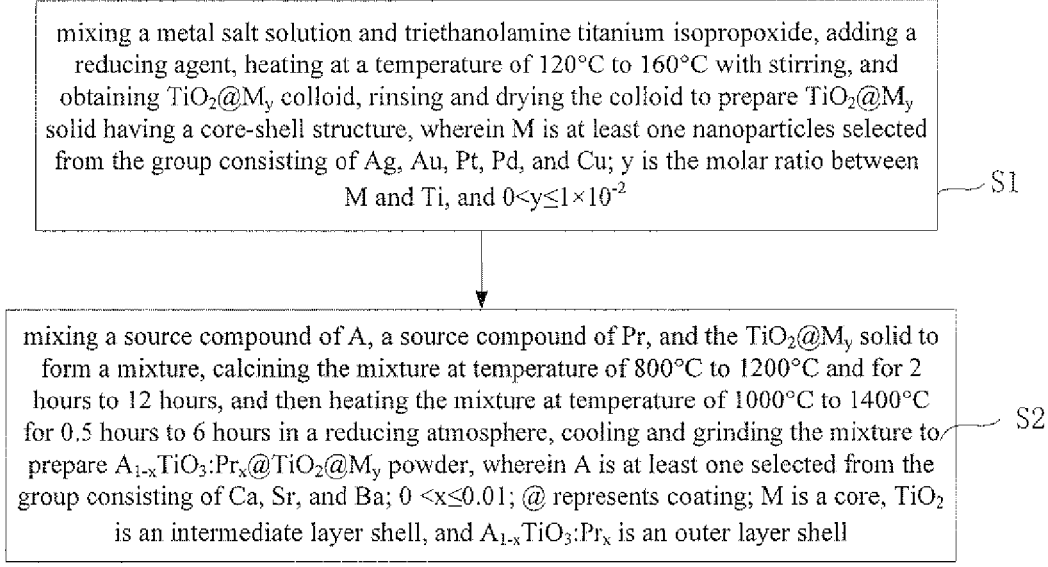
FIG. 1 is a flow chart of a method of preparing a titanate luminescent material in accordance with one embodiment.

Referring to FIG. 1, a method of preparing the titanate luminescent material includes the following steps:

Step S1, a metal salt solution and triethanolamine titanium isopropoxide are mixed, a reducing agent is then added to the mixture. The mixture is heated at a temperature of 120° C. to 160° C. (preferably 140° C.) with stirring to form $TiO_2@M_y$ colloid. The colloid is rinsed and dried to prepare $TiO_2@M_y$ solid having a core-shell structure, where M is at least one nanoparticles selected from the group consisting of Ag, Au, Pt, Pd, and Cu; y is the molar ratio between M and Ti, and $0 < y \leq 1 \times 10^{-2}$.

The metal salt solution can be at least one soluble salt solution of metal selected from the group consisting of Ag, Au, Pt, Pd, and Cu.

In the present embodiment, the reducing agent is dimethyl formamide, and a volume of the reducing agent is 20% to 80% of the sum volume of metal salt solution, triethanolamine titanium isopropoxide, and the reducing agent. Additionally, the volume of the reducing agent is 25% to 50% of the sum volume of metal salt solution, triethanolamine titanium isopropoxide, and the reducing agent.

In the present embodiment, the $TiO_2@M_y$ colloid is firstly centrifugally precipitated and then rinsed with ethanol.

Step S2, a source compound of A, a source compound of Pr, and the $TiO_2@M_y$ solid are mixed to form a mixture, the mixture is calcinated at temperature of 800° C. to 1200° C. and for 2 hours to 12 hours, and then the mixture is heated at temperature of 1000° C. to 1400° C. for 0.5 hours to 6 hours in a reducing atmosphere, the mixture is cooled and ground to prepare $A_{1-x}TiO_3:Pr_x@TiO_2@M_y$ powder, wherein A is at least one selected from the group consisting of Ca, Sr, and Ba; $0 < x \leq 0.01$; g represents coating; M is a core, $TiO_2$ is an intermediate layer shell, and $A_{1-x}TiO_3:Pr_x$ is an outer layer shell.

The source compound of A is at least one selected from the group consisting of oxide, carbonate, nitrate, and hydroxide of A.

The source compound of Pr in step two is at least one selected from the group consisting of oxide, carbonate, nitrate, and hydroxide of Pr.

The reducing atmosphere includes at least one reducing gas selected from the group consisting of mixed atmosphere of nitrogen and hydrogen, carbon, carbon monoxide, and pure hydrogen.

In the present embodiment, the reducing atmosphere is at least one reducing gas of mixed atmosphere of nitrogen ($N_2$) and hydrogen ($H_2$), carbon (C), carbon monoxide (CO), and pure hydrogen ($H_2$).

The preparation method has many advantages, such as simple procedure, low the equipment requirement, low cost, no pollution, and easy control of the reaction, such that it is suitable for industrial production.

The specific examples are described below.

Example 1

Preparation of titanate luminescent material of $Sr_{0.999}TiO_3:Pr_{0.001}@TiO_2@Au_{1 \times 10^{-2}}$ using a high-temperature solid-phase synthesis method is described below.

Preparation of $TiO_2@Au_{1 \times 10^{-2}}$: 10.3 mg of chloroauric acid ($AuCl_3.HCl. 4H_2O$) was weighed and dissolved into deionized water to prepare 20 mL of chloroauric acid solution with a concentration of $5 \times 10^{-3}$ mol/L. 5 mL of triethanolamine titanium isopropoxide with a concentration of 4.3 mol/L was measured and diluted with isopropanol to a concentration of 1 mol/L. 10 mL of $5 \times 10^{-3}$ mol/L chloroauric acid solution and 5 mL of 1 mol/L isopropanol solution containing triethanolamine titanium isopropoxide were mixed and stirred, 15 mL of dimethyl formamide was added. After stirring for 15 min at a room temperature, the mixture was heated to 160° C. and stirred using a reflux device, when the color of solution turned light brown through colorless and turned dark brown, the heating was stopped, the system was cooled to the room temperature, and $TiO_2@Au_{1 \times 10^{-2}}$ colloid was obtained. The colloid was then centrifuged, rinsed with ethanol and dried, and $TiO_2@Au_{1 \times 10^{-2}}$ solid was prepared, where $y = 1 \times 10^{-2}$.

Preparation of titanate luminescent material $Sr_{0.999}TiO_3:Pr_{0.001}@TiO_2@Au_{1 \times 10^{-2}}$: 0.5175 g of SrO, 0.0009 g of $Pr_6O_{11}$, and 0.4195 g of $TiO_2@Au_{1 \times 10^{-2}}$ powder were weighed and ground sufficiently in an agate mortar to mix evenly, the mixture powder was then transferred to a corundum crucible, heated at 800° C. in a muffle furnace for 12 h, then sintered and reduced at 1300° C. for 4 h in a tube furnace under a $H_2$ reducing atmosphere. After cooling the powder to the room temperature, titanate luminescent material $Sr_{0.999}TiO_3:Pr_{0.001}@TiO_2@Au_{1 \times 10^{-2}}$ was obtained.

Example 2

Preparation of titanate luminescent material of $Ca_{0.998}TiO_3:Pr_{0.002}@TiO_2@Ag_{5 \times 10^{-4}}$ using a high-temperature solid-phase synthesis method is described below.

Preparation of $TiO_2@Ag_{5 \times 10^{-4}}$: 3.4 mg of silver nitrate ($AgNO_3$) was weighed and dissolved into deionized water to prepare 20 mL of silver nitrate solution with a concentration of $1 \times 10^{-3}$ mol/L. 10 mL of triethanolamine titanium isopropoxide with a concentration of 4.3 mol/L was measured and diluted with isopropanol to a concentration of 0.22 mol/L. 2 mL of $1 \times 10^{-3}$ mol/L silver nitrate solution and 18 mL of 0.22 mol/L isopropanol solution containing triethanolamine titanium isopropoxide were mixed and stirred, 10 mL of dimethyl formamide was added. After stirring for 15 min at a room temperature, the mixture was heated to 140° C. and stirred using a reflux device, when the color of solution turned light brown through colorless and turned dark brown, the heating was stopped, the system was cooled to the room temperature, and $TiO_2@Ag_{5 \times 10^{-4}}$ colloid was obtained. The colloid was then centrifuged, rinsed with ethanol and dried, and $TiO_2@Ag_{5 \times 10^{-4}}$ solid was prepared, where $y = 5 \times 10^{-4}$.

Preparation of titanate luminescent material $Ca_{0.998}TiO_3:Pr_{0.002}@TiO_2@Ag_{5 \times 10^{-4}}$: 0.3996 g of $CaCO_3$, 0.0014 g of $Pr_6O_{11}$, and 0.3196 g of $TiO_2@Ag_{5 \times 10^{-4}}$ powder were weighed and ground sufficiently in an agate mortar to mix evenly, the mixture powder was then transferred to a corundum crucible, heated at 1000° C. in a muffle furnace for 6 h, then sintered and reduced at 1200° C. for 4 h in a tube furnace under a 95% $N_2$+5% $H_2$ weak reducing atmosphere. After cooling the powder to the room temperature, titanate luminescent material $Ca_{0.998}TiO_3:Pr_{0.002}@TiO_2@Ag_{5\times10^{-4}}$ was obtained.

Figure 2:
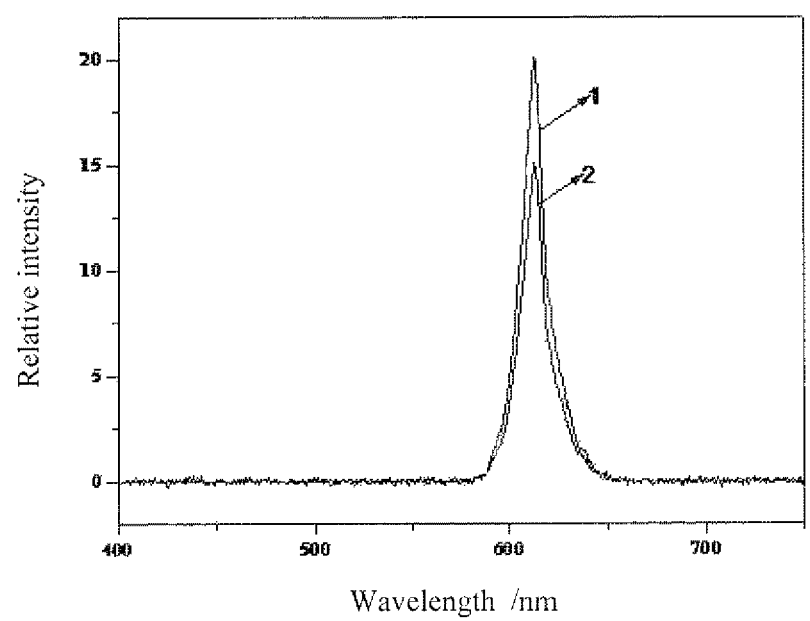
FIG. 2 is a graphical representation of cathodoluminescence spectrum under a voltage of 1.kV of the luminescent material formed in accordance with Example 2 (designated as #1), and the luminescent material of $Ca_{0.998}TiO_3: Pr_{0.002}@TiO_2$ without coating metal nanoparticles (designated as #2).

FIG. 2 is a graphical representation of cathodoluminescence spectrum under a voltage of 1.5 kV of the luminescent material formed in accordance with Example 2, and the luminescent material of $Ca_{0.998}TiO_3: Pr_{0.002}@TiO_2$ without coating metal nanoparticles. It can be seen from FIG. 2 that, at an emission peak of 612 nm, the emission intensity of luminescent material coating metal nanoparticles is enhanced by 30% comparing to $Ca_{0.998}TiO_3: Pr_{0.002}@TiO^2$ without coating metal nanoparticles Ag. Accordingly, the luminescent material according to Example 2 has a good stability, good color purity and high luminous efficiency.

Example 3

Preparation of titanate luminescent material of $Ba_{0.995}TiO_3: Pr_{0.005}@TiO_2@Pt_{5\times10^{-3}}$ using a high-temperature solid-phase synthesis method is described below.

Preparation of $TiO_2@Pt_{5\times10^{-3}}$: 25.9 mg of chloroplatinic acid ($H_2PtCl_6.6H_2O$) was weighed and dissolved into deionized water to prepare 10 mL of chloroplatinic acid solution with a concentration of $2.5\times10^{-3}$ mol/L. 5 mL of triethanolamine titanium isopropoxide with a concentration of 4.3 mol/L was measured and diluted with isopropanol to a concentration of 0.5 mol/L. 8 mL of $2.5\times10^{-3}$ mol/L chloroplatinic acid solution and 16 mL of 0.5 mol/L isopropanol solution containing triethanolamine titanium isopropoxide were mixed and stirred, 6 mL of dimethyl formamide was added. After stirring for 15 min at a room temperature, the mixture was heated to 140° C. and stirred using a reflux device, when the color of solution turned light brown through colorless and turned dark brown, the heating was stopped, the system was cooled to the room temperature, and $TiO_2@Pt_{5\times10^{-3}}$ colloid was obtained. The colloid was then centrifuged, rinsed with ethanol and dried, and $TiO_2@Pt_{5\times10^{-3}}$ solid was prepared, where $y=5\times10^{-3}$.

Preparation of titanate luminescent material $Ba_{0.995}TiO_3: Pr_{0.005}@TiO_2@Pt_{5\times10^{-3}}$: 0.6819 g of $Ba(OH)_2$, 0.0034 g of $Pr_6O_{11}$, and 0.3196 g of $TiO_2@Pt_{5\times10^{-3}}$ powder were weighed and ground sufficiently in an agate mortar to mix evenly, the mixture powder was then transferred to a corundum crucible, heated at 1200° C. in a muffle furnace for 2 h, then sintered and reduced at 1400° C. for 0.5 h in a tube furnace under a carbon reducing atmosphere. After cooling the powder to the room temperature, titanate luminescent material $Ba_{0.995}TiO_3: Pr_{0.005}@TiO_2@Pt_{5\times10^{-3}}$ was obtained.

Example 4

Preparation of titanate luminescent material of $Ca_{0.99}TiO_3:Pr_{0.01}@TiO_2@Pd_{1\times10^{-5}}$ using a high-temperature solid-phase synthesis method is described below.

Preparation of $TiO_2Pd_{1\times10^{-5}}$: 0.22 mg of palladium chloride ($PdCl_2.2H_2O$) was weighed and dissolved into deionized water to prepare 20 mL of silver nitrate solution with a concentration of $5\times10^{-5}$ mol/L. 10 mL of triethanolamine titanium isopropoxide with a concentration of 4.3 mol/L was measured and diluted with isopropanol to a concentration of 2.5 mol/L. 5 mL of $5\times10^{-5}$ mol/L palladium chloride solution and 10 mL of 2.5 mol/L isopropanol solution containing triethanolamine titanium isopropoxide were mixed and stirred, 5 mL of dimethyl formamide was added. After stirring for 15 min at a room temperature, the mixture was heated to 130° C. and stirred using a reflux device, when the color of solution turned light brown through colorless and turned dark brown, the heating was stopped, the system was cooled to the room temperature, and $TiO_2@Pd_{1\times10^{-5}}$ colloid was obtained. The colloid was then centrifuged, rinsed with ethanol and dried, and $TiO_2@Pd_{1\times10^{-5}}$ solid was prepared, where $y=1\times10^{-5}$.

Preparation of titanate luminescent material $Ca_{0.99}TiO_3:Pr_{0.01}@TiO_2@Pd_{1\times10^{-5}}$: 0.6494 g of $Ca(NO_3)_2$, 0.0137 g of $Pr(NO_3)_3$, and 0.3260 g of $TiO_2@Pd_{1\times10^{-5}}$ powder were weighed and ground sufficiently in an agate mortar to mix evenly, the mixture powder was then transferred to a corundum crucible, heated at 1100° C. in a muffle furnace for 4 h, then sintered and reduced at 1200° C. for 6 h in a tube furnace under a 95% $N_2$+5% $H_2$ weak reducing atmosphere. After cooling the powder to the room temperature, titanate luminescent material $Ca_{0.99}TiO_3:Pr_{0.01}@TiO_2@Pd_{1\times10^{-5}}$ was obtained.

Example 5

Preparation of titanate luminescent material of $(Ca_{0.6}Sr_{0.4})_{0.996}TiO_3:Pr_{0.004}@TiO_2@Cu_{1\times10^{-4}}$ using a high-temperature solid-phase synthesis method is described below.

Preparation of $TiO_2@Cu_{1\times10^{-4}}$: 1.6 mg of copper nitrate was weighed and dissolved into ethanol to prepare 20 mL of copper nitrate solution with a concentration of $4\times10^{-4}$ mol/L. 5 mL of triethanolamine titanium isopropoxide with a concentration of 4.3 mol/L was measured and diluted with isopropanol to a concentration of 2 mol/L. 2 mL of $4\times10^{-4}$ mol/L copper nitrate solution and 4 mL of 2 mol/L isopropanol solution containing triethanolamine titanium isopropoxide were mixed and stirred, 24 mL of dimethyl formamide was added. After stirring for 15 min at a room temperature, the mixture was heated to 120° C. and stirred using a reflux device, when the color of solution turned light brown through colorless and turned dark brown, the heating was stopped, the system was cooled to the room temperature, and $TiO_2@Cu_{1\times10^{-4}}$ colloid was obtained. The colloid was then centrifuged, rinsed with ethanol and dried, and $TiO_2@Cu_{1\times10^{-4}}$ solid was prepared, where $y=1\times10^{-4}$.

Preparation of titanate luminescent material $(Ca_{0.6}Sr_{0.4})_{0.996}TiO_3:Pr_{0.004}@TiO_2@Cu_{1\times10^{-4}}$: 0.1817 g of $Ca(OH)_2$, 0.0485 g of $Sr(OH)_2$, 0.0027 g of $Pr_6O_{11}$, and 0.196 g of $TiO_2@Cu_{1\times10^{-4}}$ powder were weighed and ground sufficiently in an agate mortar to mix evenly, the mixture powder was then transferred to a corundum crucible, heated at 900° C. in a muffle furnace for 3 h, then sintered and reduced at 1000° C. for 6 h in a tube furnace under a CO reducing atmosphere. After cooling the powder to the room temperature, titanate luminescent material $(Ca_{0.6}Sr_{0.4})_{0.996}TiO_3:Pr_{0.004}@TiO_2@Cu_{1\times10^{-4}}$ was obtained.

Example 6

Preparation of titanate luminescent material of $Ba_{0.994}TiO_3: Pr_{0.006}@TiO_2(Ag_{0.5}/Au_{0.5})_{1.25\times10^{-3}}$ using a high-temperature solid-phase synthesis method is described below.

Preparation of $TiO_2@(Ag_{0.5}/Au_{0.5})_{1.25\times10^{-3}}$: 6.2 mg of chloroauric acid ($AuCl_3.HCl.4H_2O$) and 2.5 mg $AgNO_3$ were dissolved in 28 mL deionized water to prepare 30 mL of mixed solution of chloroauric acid and silver nitrate with a sum metal concentration of $1\times10^{-3}$ mol/L (each of chloroauric acid and silver nitrate had a concentration of $0.5\times10^{-3}$ mol/L). 2 mL of triethanolamine titanium isopropoxide with a concentration of 4.3 mol/L was measured and diluted with isopropanol to a concentration of 0.4 mol/L. 5 mL of $1\times10^{-3}$ mol/L mixed solution of chloroauric acid and silver nitrate and 10 mL of 0.4 mol/L isopropanol solution containing triethanolamine titanium isopropoxide were mixed and stirred, 10 mL of dimethyl formamide was added. After stirring for 15 min at a room temperature, the mixture was heated to 150° C. and stirred using a reflux device, when the color of solution turned light brown through colorless and turned dark brown, the heating was stopped, the system was cooled to the room temperature, and $TiO_2@(Ag_{0.5}/Au_{0.5})_{1.25\times10^{-3}}$ colloid was obtained. The colloid was then centrifuged, rinsed with ethanol and dried, and $TiO_2@(Ag_{0.5}/Au_{0.5})_{1.25\times10^{-3}}$ solid was prepared, where $y=1.25\times10^{-3}$.

Preparation of titanate luminescent material $Ba_{0.994}TiO_3:Pr_{0.006}@TiO_2@(Ag_{0.5}/Au_{0.5})_{1.25\times10^{-3}}$: 0.7845 of $BaCO_3$, 0.0010 g of $Pr_6O_{11}$, and 0.3196 g of $TiO_2@Cu_{1\times10^{-4}}$ powder were weighed and ground sufficiently in an agate mortar to mix evenly, the mixture powder was then transferred to a corundum crucible, heated at 900° C. in a muffle furnace for 5 h, then sintered and reduced at 1300° C. for 4 h in a tube furnace under a 95% $N_2$+5% $H_2$ weak reducing atmosphere. After cooling the powder to the room temperature, titanate luminescent material $Ba_{0.994}TiO_3:Pr_{0.006}@TiO_2@(Ag_{0.5}/Au_{0.5})_{1.25\times10^{-3}}$ was obtained.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. A titanate luminescent material, having a formula of $A_{1-x}TiO_3:Pr_x@TiO_2@M_y$;
   wherein A is at least one selected from the group consisting of Ca, Sr, and Ba;
   M is at least one nanoparticles selected from the group consisting of Ag, Au, Pt, Pd, and Cu;
   $0<x\leq0.01$;
   y is the molar ratio between M and Ti in $TiO_2@M_y$, and $0<y\leq1\times10^{-2}$;
   @ represents coating;
   M is a core,
   $TiO_2$ is an intermediate layer shell, and
   $A_{1-x}TiO_3:Pr_x$ is an outer layer shell.

2. The titanate luminescent material according to claim 1, wherein $0.001\leq x\leq0.005$.

3. The titanate luminescent material according to claim 1, wherein $1\times10^{-5}\leq y\leq5\times10^{-3}$.

4. A method of preparing a titanate luminescent material, comprising the following steps:
   step one, mixing a metal salt solution and triethanolamine titanium isopropoxide, adding a reducing agent, heating at a temperature of 120° C. to 160° C. with stirring, and obtaining $TiO_2@M_y$ colloid, rinsing and drying the colloid to prepare $TiO_2@M_y$ solid having a core-shell structure, wherein M is at least one nanoparticles selected from the group consisting of Ag, Au, Pt, Pd, and Cu; y is the molar ratio between M and Ti, and $0<y\leq1\times10^{-2}$;
   step two, mixing a source compound of A, a source compound of Pr, and the $TiO_2@M_y$ solid to form a mixture, calcining the mixture at temperature of 800° C. to 1200° C. and for 2 hours to 12 hours, and then heating the mixture at temperature of 1000° C. to 1400° C. for 0.5 hours to 6 hours in a reducing atmosphere, cooling and grinding the mixture to prepare $A_{1-x}TiO_3:Pr_x@TiO_2@M_y$ powder, wherein A is at least one selected from the group consisting of Ca, Sr, and Ba; $0<x\leq0.01$; @ represents coating; M is a core, $TiO_2$ is an intermediate layer shell, and $A_{1-x}TiO_3:Pr_x$ is an outer layer shell.

5. The method according to claim 4, wherein the source compound of A in step two is at least one selected from the group consisting of oxide, carbonate, nitrate, and hydroxide of A.

6. The method according to claim 4, wherein the source compound of Pr in step two is at least one selected from the group consisting of oxide, carbonate, nitrate, and hydroxide of Pr.

7. The method according to claim 4, wherein in step one, the reducing agent is dimethyl formamide; and a volume of the reducing agent is 20% to 80% of the sum volume of metal salt solution, triethanolamine titanium isopropoxide, and the reducing agent.

8. The method according to claim 7, wherein the volume of the reducing agent is 25% to 50% of the sum volume of metal salt solution, triethanolamine titanium isopropoxide, and the reducing agent.

9. The method according to claim 4, wherein in step one, the $TiO_2@M_y$ colloid is centrifugally precipitated and then rinsed with ethanol.

10. The method according to claim 4, wherein the reducing atmosphere in step two comprises at least one reducing gas selected from the group consisting of mixed atmosphere of nitrogen and hydrogen, carbon, carbon monoxide, and pure hydrogen.

* * * * *